(12) United States Patent
Ochiai et al.

(10) Patent No.: US 11,099,001 B2
(45) Date of Patent: Aug. 24, 2021

(54) INSPECTION APPARATUS, INSPECTION METHOD, COMPUTER PROGRAM AND RECORDING MEDIUM

(71) Applicant: PIONEER CORPORATION, Tokyo (JP)

(72) Inventors: Takanori Ochiai, Kawagoe (JP); Masakazu Ogasawara, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 81 days.

(21) Appl. No.: 16/467,368

(22) PCT Filed: Nov. 14, 2017

(86) PCT No.: PCT/JP2017/040908
§ 371 (c)(1),
(2) Date: Jun. 6, 2019

(87) PCT Pub. No.: WO2018/105332
PCT Pub. Date: Jun. 14, 2018

(65) Prior Publication Data
US 2019/0331476 A1   Oct. 31, 2019

(30) Foreign Application Priority Data
Dec. 6, 2016 (JP) .............................. JP2016-236666

(51) Int. Cl.
*G01B 11/06* (2006.01)
(52) U.S. Cl.
CPC ................................ *G01B 11/0625* (2013.01)

(58) Field of Classification Search
CPC ................................ G01B 11/06; G01N 21/59
See application file for complete search history.

(56) References Cited

U.S. PATENT DOCUMENTS 7,551,269 B2 * 6/2009 Itsuji ................. G01N 21/3581
250/330
7,919,752 B2 * 4/2011 Itsuji ................. G01N 21/3581
250/339.06

(Continued)

FOREIGN PATENT DOCUMENTS

| CN | 102449450 A | 5/2012 |
| CN | 103091259 A | 5/2013 |

(Continued)

OTHER PUBLICATIONS

International Search Report, dated Jan. 16, 2018, from corresponding PCT application No. PCT/JP2017/040908.

*Primary Examiner* — David P Porta
*Assistant Examiner* — Djura Malevic
(74) *Attorney, Agent, or Firm* — Nixon & Vanderhye

(57) ABSTRACT

An inspecting device is provided with: a radiating unit which radiates terahertz waves onto a sample laminated into a plurality of layers; a detecting unit which acquires a detected waveform by detecting terahertz waves from the sample; a selecting unit which selects a portion of a library representing an estimated waveform, on the basis of the detected waveform; and an estimating unit which estimates a position of an interface between the plurality of layers, on the basis of the detected waveform and the selected partial library.

18 Claims, 5 Drawing Sheets

(56) References Cited

U.S. PATENT DOCUMENTS

| | | | | |
|---|---|---|---|---|
| 7,933,027 B1* | 4/2011 | Roth | G01N 21/3581 | 356/630 |
| 8,110,800 B2* | 2/2012 | Shishido | G03F 7/70625 | 250/311 |
| 8,111,604 B2* | 2/2012 | Nakano | G11B 7/26 | 369/275.3 |
| 8,187,424 B2* | 5/2012 | Haran | D21F 7/003 | 162/198 |
| 8,440,971 B2* | 5/2013 | Ouchi | G01N 21/3581 | 250/338.1 |
| 8,481,936 B2* | 7/2013 | Shishido | G03F 1/84 | 250/311 |
| 8,513,608 B2* | 8/2013 | Ohtake | G01B 11/0633 | 250/341.8 |
| 8,514,403 B2* | 8/2013 | Ogawa | G01N 21/3581 | 356/496 |
| 8,577,124 B2* | 11/2013 | Toyoda | G06T 7/0006 | 382/145 |
| 8,723,124 B2* | 5/2014 | Endo | G01J 3/0289 | 250/339.07 |
| 8,869,081 B2* | 10/2014 | Saleh | H01L 22/12 | 716/106 |
| 9,068,819 B2* | 6/2015 | Kubota | G01B 11/06 | |
| 9,354,049 B2* | 5/2016 | Shishido | G01B 15/04 | |
| 9,633,429 B2* | 4/2017 | Usui | G06T 7/0006 | |
| 2007/0187595 A1* | 8/2007 | Tanaka | G01N 23/2251 | 250/307 |
| 2009/0212212 A1* | 8/2009 | Shishido | G03F 7/70625 | 250/307 |
| 2009/0214103 A1* | 8/2009 | Tanaka | G06T 7/001 | 382/145 |
| 2010/0046349 A1* | 2/2010 | Nakano | G11B 7/26 | 369/112.23 |
| 2010/0148069 A1* | 6/2010 | Ouchi | G01N 21/4795 | 250/341.8 |
| 2010/0309759 A1* | 12/2010 | Sato | G11B 7/14 | 369/44.26 |
| 2011/0267600 A1* | 11/2011 | Ouchi | G01N 21/3581 | 356/51 |
| 2012/0112067 A1* | 5/2012 | Shishido | G03F 1/86 | 250/307 |
| 2012/0113425 A1* | 5/2012 | Endo | G01J 3/02 | 356/402 |
| 2012/0223229 A1* | 9/2012 | Itsuji | G01J 3/0229 | 250/330 |
| 2012/0318967 A1* | 12/2012 | Itsuji | G01J 3/28 | 250/252.1 |
| 2012/0326037 A1* | 12/2012 | Ohtake | G01N 21/8422 | 250/338.1 |
| 2013/0107269 A1* | 5/2013 | Shioda | G01B 9/0209 | 356/451 |
| 2013/0218008 A1* | 8/2013 | Itsuji | A61B 5/0507 | 600/425 |
| 2013/0262027 A1* | 10/2013 | Shishido | G01B 21/04 | 702/155 |
| 2013/0334421 A1* | 12/2013 | Itsuji | G01J 5/0205 | 250/341.8 |
| 2014/0146306 A1* | 5/2014 | Kubota | G01B 11/06 | 356/51 |
| 2014/0166883 A1* | 6/2014 | Ono | G01N 21/59 | 250/339.06 |
| 2014/0291524 A1* | 10/2014 | Kubota | G01N 21/3586 | 250/341.8 |
| 2015/0008324 A1* | 1/2015 | Itsuji | G01N 21/3581 | 250/330 |
| 2015/0211934 A1* | 7/2015 | Van Mechelen | G01B 11/0625 | 250/339.06 |
| 2016/0069673 A1* | 3/2016 | Takayanagi | G01B 11/0641 | 250/339.11 |
| 2017/0023469 A1* | 1/2017 | Zimdars | G01N 21/41 | |
| 2018/0038681 A1* | 2/2018 | Van Mechelen | G01B 11/0683 | |
| 2018/0066935 A1* | 3/2018 | Burdette | G01J 3/453 | |
| 2018/0161812 A1* | 6/2018 | Seong | B05B 12/084 | |
| 2019/0078873 A1* | 3/2019 | Saeedkia | G01S 17/10 | |
| 2019/0234872 A1* | 8/2019 | Ochiai | G01B 11/00 | |
| 2019/0331476 A1* | 10/2019 | Ochiai | G01N 21/17 | |
| 2019/0383599 A1* | 12/2019 | Gregory | G01N 33/32 | |
| 2020/0103341 A1* | 4/2020 | Ochiai | G01B 15/02 | |
| 2020/0182980 A1* | 6/2020 | Sato | G02B 26/101 | |
| 2020/0191562 A1* | 6/2020 | Yamaguchi | G01N 21/3586 | |
| 2020/0241117 A1* | 7/2020 | Ochiai | G01S 17/42 | |

FOREIGN PATENT DOCUMENTS

| | | |
|---|---|---|
| JP | 2009-109449 A | 5/2009 |
| JP | 2012-225718 A | 11/2012 |
| JP | 2014-122875 A | 7/2014 |
| WO | 2010-137173 A1 | 12/2010 |
| WO | 2016/132452 A1 | 8/2016 |

* cited by examiner

INSPECTION APPARATUS, INSPECTION METHOD, COMPUTER PROGRAM AND RECORDING MEDIUM

TECHNICAL FIELD

The present invention relates to a technical field of an inspection apparatus and an inspection method that is configured to estimate a position of a boundary surface of a plurality of layers that constitute a sample by using a terahertz wave, a computer program that is configured to allow a computer to execute this inspection method and a recording medium on which this computer program is recorded, for example.

BACKGROUND ART

An inspection apparatus using a terahertz wave is known. A terahertz wave inspection apparatus is configured to estimate (in other words, calculate or specify) characteristics of a sample in accordance with a below described procedure. Firstly, a pump light (in other words, an excitation light) is irradiated to a terahertz wave generating element to which a bias voltage is applied, wherein the pump light is one laser light that is obtained by branching an ultrashort pulse laser light (for example, a femtosecond pulse laser light). As a result, the terahertz wave generating element generates the terahertz. The terahertz wave generated by the terahertz wave generating element is irradiated to the sample. The terahertz wave irradiated to the sample is irradiated, as a reflected terahertz wave (alternatively, a transmitted terahertz wave) from the sample, to a terahertz wave detecting element to which a probe light (in other words, an excitation light) is irradiated, wherein the probe light is another laser light that is obtained by branching the ultrashort pulse laser light and has an optical delay (namely, a difference of a length of an light path) with respect to the pump light. As a result, the terahertz wave detecting element detects the terahertz wave reflected by or transmitted through the sample. The terahertz wave inspection apparatus estimates the characteristics of the sample by analyzing the detected terahertz wave (namely, the terahertz wave in a time domain and an electrical current signal).

When the sample is a laminated object in which a plurality of layers are laminated, a thickness of the layer is one example of the characteristics that can be estimated by the terahertz wave inspection apparatus. Patent Literatures 1 and 2 disclose one example of the terahertz wave inspection apparatus that is capable of estimating the thickness. Specifically, the terahertz wave inspection apparatus disclosed in the Patent Literature 1 is configured to estimates the thickness by executing an operation of comparing a pulse waveform (hereinafter, it is referred to as an "estimated waveform") that is estimated to be included in the terahertz wave reflected by the sample that is characterized by a certain parameter (for example, the thickness, a material and so on) and an actually detected terahertz (hereinafter, it is referred to as a "detected waveform") a plurality of times for the plurality of estimated waveforms that correspond to a plurality of different parameters, respectively.

CITATION LIST

Patent Literature

[Patent Literature 1] Japanese Unexamined Patent Application Publication No. 2012-225718

[Patent Literature 2] Japanese Unexamined Patent Application Publication No. 2014-122875

SUMMARY OF INVENTION

Technical Problem

The terahertz wave inspection apparatus disclosed in the Patent Literature 1 has to compare the detected waveform and each of the plurality of estimated waveforms that correspond to all of the predetermined parameters, respectively. Therefore, a processing cost for estimating the thickness is relatively large.

Note that an operation for estimating the thickness of a certain layer is substantially equivalent to an operation for estimating a position of a boundary surface of a certain layer, because the thickness is estimated on the basis of the pulse waveform corresponding to the reflected wave of the terahertz wave from the boundary surface of a certain layer The above described technical problem is one example of the technical problem to be solved by the present invention. It is therefore an object of the present invention to provide, for example, an inspection apparatus and an inspection method that is capable of properly estimating a position of a boundary surface of a plurality of layers with a relatively small processing cost, a computer program that allows a computer to execute this inspection method and a recording medium on which this computer program is recorded.

Solution to Problem

First example of an inspection apparatus of the present invention is provided with: an irradiating device that is configured to irradiate a sample in which a plurality of layers are laminated with a terahertz wave; a detecting device that is configured to detect the terahertz wave from the sample to obtain a detected waveform; a selecting device that is configured to select one portion of a library on the basis of the detected waveform, the library indicating an estimated waveform of the terahertz wave from the sample; and an estimating device that is configured to estimate a position of a boundary surface of the plurality of layers on the basis of the detected waveform and the selected one portion of the library.

First example of an inspection method of the present invention includes: an irradiating step at which a terahertz wave is irradiated to a sample in which a plurality of layers are laminated; a detecting step at which the terahertz wave from the sample is detected to obtain a detected waveform; a selecting step at which one portion of a library is selected on the basis of the detected waveform, the library indicating an estimated waveform of the terahertz wave from the sample; and an estimating step at which a position of a boundary surface of the plurality of layers is estimated on the basis of the detected waveform and the selected one portion of the library.

First example of a computer program of the present invention is allow a computer to execute the above described first example of the inspection method of the present invention.

First example of a recording medium of the present invention is a recording medium on which the above described first example of the computer program of the present invention is recorded.

DESCRIPTION OF EMBODIMENTS

Figure 1:
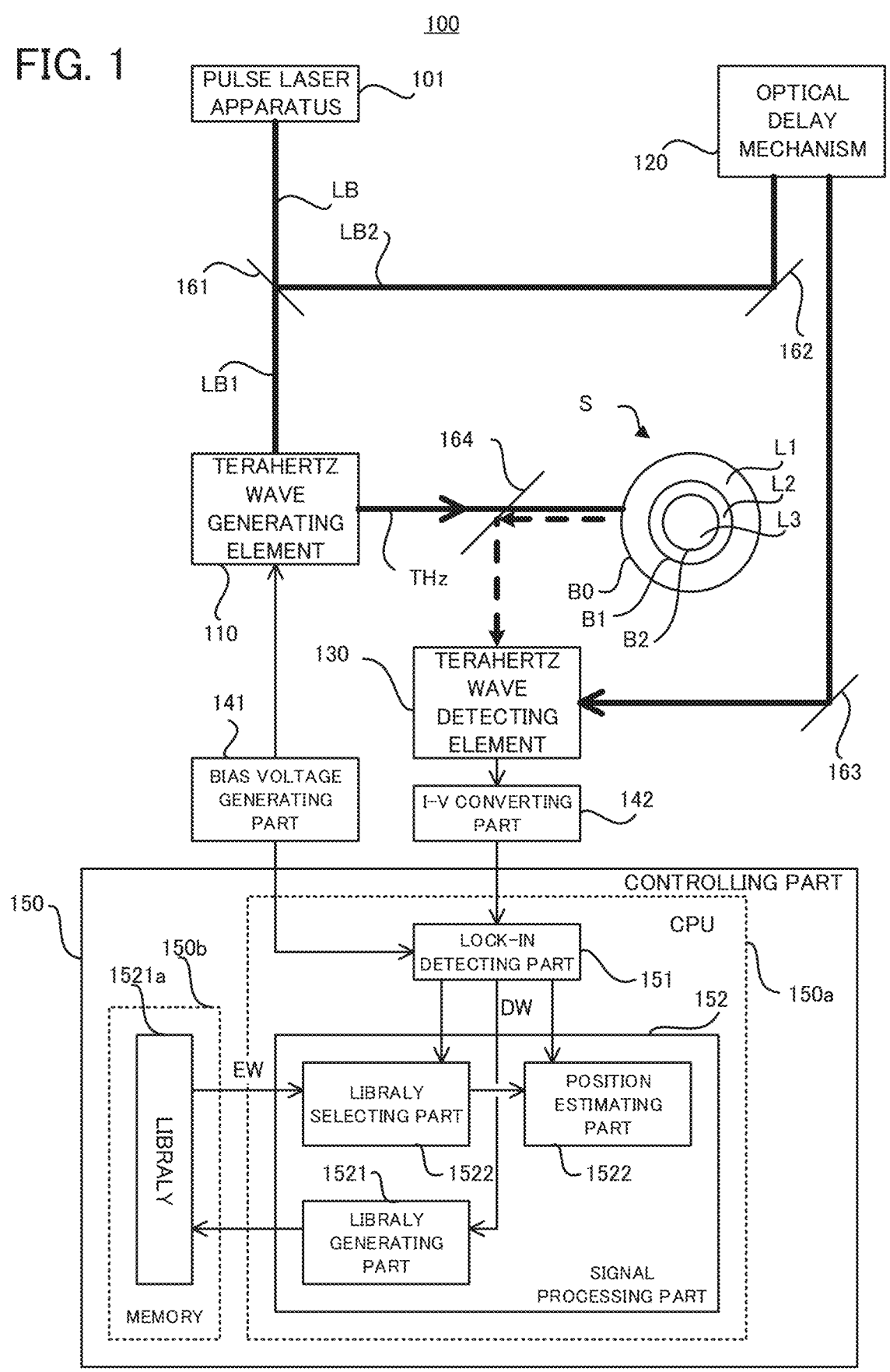
FIG. 1 is a block diagram that illustrates a structure of a terahertz wave inspection apparatus in a present example.

Hereinafter, one embodiment of an inspection apparatus, an inspection method, a computer program and a recording medium will be described.

(Embodiment of Inspection Apparatus)
<1>

An inspection apparatus in the present embodiment is provided with: an irradiating device that is configured to irradiate a sample in which a plurality of layers are laminated with a terahertz wave; a detecting device that is configured to detect the terahertz wave from the sample to obtain a detected waveform; a selecting device that is configured to select one portion of a library on the basis of the detected waveform, the library indicating an estimated waveform of the terahertz wave from the sample; and an estimating device that is configured to estimate a position of a boundary surface of the plurality of layers on the basis of the detected waveform and the selected one portion of the library.

According to the inspection apparatus in the present embodiment, the position of the boundary surface is estimated on the basis of the detected waveform and one portion of the library selected on the basis of the detected waveform. Namely, the inspection apparatus does not necessarily estimate the position of the boundary surface on the basis of the detected waveform and all of the library. Thus, the inspection apparatus is capable of properly estimating the position of the boundary surface of the plurality of layers with a relatively small processing cost.

<2>

In another aspect of the inspection apparatus in the present embodiment, the estimating device is configured to select one portion of the library on the basis of a condition of a boundary surface pulse wave in the detected waveform, the boundary surface pulse wave corresponds to the boundary surface.

According to this aspect, the inspection apparatus is capable of properly selecting one portion of the library on the basis of the condition of the boundary surface pulse wave.

<3>

In another aspect of the inspection apparatus that is configured to select one portion of the library on the basis of the condition of the boundary surface pulse wave as described above, the condition of the boundary surface pulse wave includes at least one of a relative relationship between positions at which a local maximum value and a local minimum value of the boundary surface pulse wave appear and a slope of a waveform of the boundary surface pulse wave between the local maximum value and the local minimum value.

According to this aspect, the inspection apparatus is capable of properly selecting one portion of the library on the basis of the condition of the boundary surface pulse wave.

<4>

In another aspect of the inspection apparatus that is configured to select one portion of the library on the basis of the condition of the boundary surface pulse wave as described above, the boundary surface pulse wave corresponds to the boundary surface forming a border between adjacent two layers, a magnitude relationship of refractive index of the adjacent two layers with respect to the terahertz wave inverts depending on the condition of the adjacent two layers.

According to this aspect, the inspection apparatus is capable of properly selecting one portion of the library on the basis of the condition of the boundary surface pulse wave.

<5>

In another aspect of the inspection apparatus that is configured to select one portion of the library on the basis of the condition of the boundary surface pulse wave as described above, the boundary surface pulse wave corresponds to the boundary surface forming a border between a first layer and a second layer, a condition of a phase in the second layer changes.

According to this aspect, the inspection apparatus is capable of properly selecting one portion of the library on the basis of the condition of the boundary surface pulse wave.

<6>

In another aspect of the inspection apparatus that is configured to select one portion of the library on the basis of the condition of the boundary surface pulse wave as described above, the selecting device is configured to select a first portion of the library when the condition of the boundary surface pulse wave is a first condition and select a second portion of the library that is different from the first portion when the condition of the boundary surface pulse wave is a second condition that is different from the first condition.

According to this aspect, the inspection apparatus is capable of properly selecting one portion of the library on the basis of the condition of the boundary surface pulse wave.

(Embodiment of Inspection Method)
<7>

An inspection method in the present embodiment includes: an irradiating step at which a terahertz wave is irradiated to a sample in which a plurality of layers are laminated; a detecting step at which the terahertz wave from the sample is detected to obtain a detected waveform; a selecting step at which one portion of a library is selected on the basis of the detected waveform, the library indicating an estimated waveform of the terahertz wave from the sample; and an estimating step at which a position of a boundary surface of the plurality of layers is estimated on the basis of the detected waveform and the selected one portion of the library.

According to the inspection method in the present embodiment, it is possible to achieve an effect that is same as an effect achievable by the above described inspection apparatus in the present embodiment.

Note that the inspection method in the present embodiment may adopt various aspects in accordance with the various aspects that are adopted by the inspection apparatus in the present embodiment.

(Embodiment of Computer Program)

<8>

A computer program in the present embodiment allows a computer to execute the above described inspection method in the present embodiment.

According to the computer program in the present embodiment, it is possible to achieve an effect that is same as an effect achievable by the above described inspection apparatus in the present embodiment.

Note that the computer program in the present embodiment may adopt various aspects in accordance with the various aspects that are adopted by the inspection apparatus in the present embodiment.

<9>

A recording medium in the present embodiment is a recording medium on which the above described computer program in the present embodiment.

According to the recording medium in the present embodiment, it is possible to achieve an effect that is same as an effect achievable by the above described inspection apparatus in the present embodiment.

Note that the recording medium in the present embodiment may adopt various aspects in accordance with the various aspects that are adopted by the inspection apparatus in the present embodiment.

These operations and other advantages of the inspection apparatus, the inspection method, the computer program and the recording medium in the present embodiment will become more apparent from the examples explained below.

As described above, the inspection apparatus in the present embodiment is provided with the irradiating device, the detecting device, the selecting device and the estimating device. The inspection method in the present embodiment includes the irradiating step, the detecting step, the selecting step and the estimating step. The computer program in the present embodiment allows the computer to execute the inspection method in the present embodiment. The recording medium in the present embodiment is a recording medium on which the computer program in the present embodiment is recorded. Thus, it is possible to properly estimate the position of the boundary surface of the plurality of layers with a relatively small processing cost.

EXAMPLE

Hereinafter, with reference to drawings, an example of an inspection apparatus, an inspection method, a computer program and a recording medium will be described. Especially, in the below described description, an example in which the inspection apparatus, the inspection method, the computer program and the recording medium are adapted to a terahertz wave inspection apparatus will be described. Note that the terahertz wave inspection apparatus is configured to estimate a position of a boundary surface of a plurality of layers by detecting a terahertz wave from a sample in which the plurality of layers are laminated (layered).

(1) Structure of Terahertz Wave Inspection Apparatus 100

Firstly, with reference to FIG. 1, a structure of the terahertz wave inspection apparatus 100 in a present example will be described. FIG. 1 is a block diagram that illustrates the structure of the terahertz wave inspection apparatus 100 in the present example As illustrated in FIG. 1, the terahertz wave inspection apparatus 100 is configured to irradiate a sample S in which a plurality of layers L are laminated with a terahertz wave THz propagating along a direction that intersects with a laminated direction of the plurality of layers L. Moreover, the terahertz wave inspection apparatus 100 is configured to detect the terahertz wave THz reflected by the sample S (namely, the terahertz wave THz irradiated to the sample S).

The terahertz wave THz is an electromagnetic wave including an electromagnetic wave component in a frequency range around one terahertz (1 THz=10^12 Hz) (namely, in a terahertz range). The terahertz range is a frequency range having characteristics of a straight propagating ability of a light and a transmitting ability of the electromagnetic wave. The terahertz range is a frequency range in which various substances have unique spectrums. Therefore, the terahertz wave inspection apparatus 100 is capable of estimating (in other words, measuring) characteristics of the sample S by analyzing the terahertz wave THz irradiated to the sample S.

In the present example, an example in which the sample S is a pipe in which chemical flows will be described. In this case, as illustrated in FIG. 1, the sample S has a pipe wall layer L1, a pipe wall layer L2 and a pipeline layer L2 as the plurality of layers L. The pipe wall layer L1 is a tubular wall part that is at an outer side (namely, a farther side from the pipeline layer L3) of the pipe wall layer L2 of the tubular wall that constitutes the pipe. The pipe wall layer L1 is a tubular wall part of the tubular wall that constitutes the pipe to which the chemical flowing in the pipeline layer L3 is not infiltrated. The pipe wall layer L2 is a tubular wall part that is at an inner side (namely, a closer side to the pipeline layer L3) of the pipe wall layer L1 of the tubular wall that constitutes the pipe. The pipe wall layer L1 is a tubular wall part of the tubular wall that constitutes the pipe to which the chemical flowing in the pipeline layer L3 is infiltrated. The pipeline layer L3 is a layer that is surrounded by the pipe wall layer L2 and that corresponds to a flow path in which the chemical flows. When the chemical flows in the pipeline wall L3, the pipeline wall L3 is a liquid layer. On the other hand, when the chemical does not flow in the pipeline wall L3, the pipeline wall L3 is a gaseous layer (for example, an air and the like). Therefore, it can be said that the pipeline wall L3 is a layer a phase of which changes.

A physicality of the pipe wall layer L1 is different from a physicality of the pipe wall layer L2, because the pipe wall layer L1 is the wall part to which the chemical is not infiltrated and the pipe wall layer L2 is the wall part to which the chemical is infiltrated. Moreover, a physicality of the pipeline layer L3 is different from the physicality of the pipe wall layer L1 and the physicality of the pipe wall layer L2.

Incidentally, when the chemical has never flown in the pipeline layer L3 (alternatively, a time at which the chemical flows in the pipeline layer L3 is shorter than a predetermined time, same applies to the following description), the chemical is not infiltrated to the pipe wall constituting the pipe. Thus, whole of the pipe wall is the pipe wall layer L1. Namely, when the chemical has never flown in the pipeline layer L3, the sample S does not have the pipe wall layer L2 and is constituted from the pipe wall layer L1 and the pipeline layer L3. On the other hand, when the chemical flows in the pipeline layer L3 once (alternatively, the time at which the chemical flows in the pipeline layer L3 is longer than the predetermined time, same applies to the following description), the chemical is infiltrated to the pipe wall constituting the pipe. Thus, one portion of the pipe wall is the pipe wall layer L1 and another one portion of the pipe wall is the pipe wall layer L2. Namely, the physicality of at least one portion of the pipe wall layer L1 changes due to the chemical flowing in the pipeline layer L3 that has contacted with the pipe wall layer L1 at first, and as a result, the portion of the pipe wall layer L1 the physicality of which is changed turns into the pipe wall layer L2.

The terahertz wave inspection apparatus 100 is configured to estimate, as the characteristics of the sample S, a position of a boundary surface B of the plurality of layers L that constitutes the sample S. Here, the boundary surface B is a surface that forms a boundary of the layer L. Especially, the boundary surface B is a surface that intersects with an irradiation direction of the terahertz wave THz, because the terahertz wave inspection apparatus 100 estimates the position of the boundary surface B. In the present example, there are a boundary surface B0, a boundary surface B1 and a boundary surface B2, as the boundary surface B. The boundary surface B0 forms a boundary between the pipe wall layer L1 and an outside of the sample S. Namely, the pipe wall layer L1 faces the outside of the sample S via the boundary surface B0. Note that the boundary surface B0 is referred to as an "outer surface B0" in the below described description, because the boundary surface B0 is the outer surface of the sample S. The boundary surface B1 forms a boundary between the pipe wall layer L1 and the pipe wall layer L2. Namely, the pipe wall layer L1 faces the pipe wall layer L2 via the boundary surface B1. The boundary surface B2 forms a boundary between the pipe wall layer L2 and the pipeline layer L3. Namely, the pipe wall layer L2 faces the pipeline layer L3 via the boundary surface B2.

A cycle of the terahertz wave THz that is irradiated to the sample S in order to estimate the position of the boundary surface B is a cycle on the order of sub-pico seconds, and thus, it is technically difficult to directly detect a waveform of the terahertz wave THz. Thus, the terahertz wave inspection apparatus 100 is configured to indirectly detect the waveform of the terahertz wave THz by using a pump probe method based on a time delay scanning. Next, the terahertz wave inspection apparatus 100 using the pump probe method will be described in detail.

As illustrated in FIG. 1, the terahertz wave inspection apparatus100 is provided with a pulse laser apparatus 101, a terahertz wave generating element 110 that is one specific example of the "irradiating device", a beam splitter 161, a reflective mirror 162, a reflective mirror 163, a half mirror 164, an optical delay mechanism 120, a terahertz wave detecting element 130 that is one specific example of the "detecting device", a bias voltage generating part 141, a I-V (electrical current—electrical voltage) converting part 142 and a controlling part 150.

The pulse laser apparatus 101 is configured to generate a pulse laser light LB that is on the order of the sub-pico seconds or a femto seconds and that has a light intensity based on a driving electrical current inputted to the pulse laser apparatus 101. The pulse laser light LB generated by the pulse laser apparatus 101 enters the beam splitter 161 via a not-illustrated light guiding path (for example, an optical fiber).

The beam splitter 161 is configured to divide (branch) the pulse laser light LB into a pump light LB1 and a probe light LB2. The pump light LB1 enters the terahertz wave generating element 110 via a not-illustrated light guiding path. On the other hand, the probe light LB2 enters the optical delay mechanism 120 via a not-illustrated light guiding path and the reflective mirror 162. Then, the probe light LB2 emitted from the optical delay mechanism 120 enters the terahertz wave detecting element 130 via the reflective mirror 163 and a not-illustrated light guiding path.

The terahertz wave generating element 110 is configured to emit the terahertz wave THz. Specifically, the terahertz wave generating element 110 has a pair of electrodes that face with each other through a gap. A bias voltage generated by the bias voltage generating part 141 is applied to the gap via a pair of electrodes. When the pump light LB1 is irradiated to the gap in the situation where an effective bias voltage (for example, the bias voltage that is not 0 volt) is applied to the gap, the pump light LB1 is also irradiated to a photoconductive layer formed under the gap. In this case, a carrier is generated by a photoexcitation caused by the pump light LB1 at the photoconductive layer to which the pump light LB1 is irradiated. As a result, a pulsed electrical current signal on the order of the sub-pico seconds or a femto seconds based on the generated carrier is generated at the terahertz wave generating element 110. The generated electrical current signal flows through a pair of the electrodes. As a result, the terahertz wave generating element 110 emits the terahertz wave THz caused by the pulsed electrical current signal.

The terahertz wave THz emitted from the terahertz wave generating element 110 passes through the half mirror 164. As a result, the terahertz wave THz passing through the half mirror 164 is irradiated to the sample S (especially, the outer surface B0 of the layer L1). The terahertz wave THz irradiated to the sample S is reflected by the sample S (especially, each of the outer surface B0, the boundary surface B1 and the boundary surface B2). The terahertz wave THz reflected by the sample S is reflected by the half mirror 164. The terahertz wave THz reflected by the half mirror 164 enters the terahertz wave detecting element 130.

The terahertz wave detecting element 130 is configured to detect the terahertz wave THz entering the terahertz wave detecting element 130. Specifically, the terahertz wave detecting element 130 has a pair of electrodes that face with each other through a gap. When the probe light LB2 is irradiated to the gap, the probe light LB2 is also irradiated to a photoconductive layer formed under the gap. In this case, a carrier is generated by a photoexcitation caused by the probe light LB2 at the photoconductive layer to which the probe light LB2 is irradiated. As a result, an electrical current signal based on the carrier flows through a pair of the electrodes. When the terahertz wave THz is irradiated to the terahertz wave detecting element 130 in the situation where the probe light LB2 is irradiated to the gap, a signal intensity of the electrical current flowing through a pair of the electrodes varies depending on a light intensity of the terahertz wave THz. The electrical current having the signal intensity that varies depending on the light intensity of the terahertz wave THz is outputted to the I-V converting part 142 via a pair of the electrodes.

The optical delay mechanism 120 is configured to adjust a difference between a length of a light path of the pump light LB1 and a length of a light path of the probe light LB2 (namely, a light path length difference). Specifically, the optical delay mechanism 120 adjusts the light path length difference by adjusting the length of the light path of the probe light LB2. When the light path length difference is adjusted, a temporal difference between a timing at which the pump light LB1 enters the terahertz wave generating element 110 (alternatively, a timing at which the terahertz wave generating element 110 emits the terahertz wave THz) and a timing at which the probe light LB2 enters the terahertz wave detecting element 130 (alternatively, a timing at which the terahertz wave detecting element 130 detects the terahertz wave THz). The terahertz wave inspection apparatus 100 indirectly detects the waveform of the terahertz wave THz by adjusting this temporal difference. For example, when the optical delay mechanism 120 increases the length of the light path of the probe light LB2 by 0.3 mm (note that this is a length of the light path in the air), the timing at which the probe light LB2 enters the terahertz wave detecting element 130 is delayed by 1 pico second. In this case, the timing at which the terahertz wave detecting element 130 detects the terahertz wave THz is delayed by 1 pico second. Considering that the terahertz wave THz having same waveform repeatedly enters the terahertz wave detecting element 130 with a cycle of several dozen of megahertz, gradually shifting the timing at which the terahertz wave detecting element 130 detects the terahertz wave THz allows the terahertz wave detecting element 130 to indirectly detect the waveform of the terahertz wave THz. Namely, the waveform of the terahertz wave THz is detectable on the basis of the detected result of the terahertz wave detecting element 130 by a below described lock-in detecting part 151.

The electrical current outputted from the terahertz wave detecting element 130 is converted into a voltage signal by the I-V converting part 142.

The controlling part 150 is configured to execute a control operation for controlling an entire operation of the terahertz wave inspection apparatus 100. The controlling part 150 has a CPU (Central Processing Unit) 150a and a memory 150b. A computer program that allows the controlling part 150 to execute the control operation is recorded in the memory 150b. When the CPU 150a executes this computer program, a logical processing block for executing the control operation is generated in the CPU 150a. However, the computer program may not be recorded in the memory 150b. In this case, the CPU 150a may execute the computer program downloaded via a network.

The controlling part 150 is configured to execute, as one example of the control operation, an estimation operation for estimating the characteristics of the sample S on the basis of the detected result of the terahertz wave detecting element 130 (namely, the voltage signal outputted from the I-V converting part 142). In order to execute the estimation operation, the controlling part 150 has, as logical processing blocks generated in the CPU 150a, the lock-in detecting part 151 that is one specific example of the "detecting device" and a signal processing part 152.

The lock-in detecting part 151 is configured to execute a synchronous detection on the voltage signal outputted from the I-V converting part 142 by using the bias voltage generated by the bias voltage generating part 141 as a reference signal. As a result, the lock-in detecting part 151 detects a sampled value of the terahertz wave THz. Same operation is repeated while adjusting the difference between the length of the light path of the pump light LB1 and the length of the light path of the probe light LB2 (namely, the light path length difference), and as a result, the lock-in detecting part 151 detects the waveform (a temporal waveform) of the terahertz wave THz detected by the terahertz wave detecting element 130. The lock-in detecting part 151 outputs, to the signal processing part 152, a detected waveform DW (namely, a waveform signal representing the detected waveform DW) that is the waveform of the terahertz wave THz detected by the terahertz wave detecting element 130. Namely, the lock-in detecting part 151 eliminates, from the voltage signal outputted from the I-V converting part 142, a noise component having a frequency that is different from that of the reference signal. Namely, the lock-in detecting part 151 detects the detected waveform DW with a relatively high sensitivity and relatively high accuracy by executing the synchronous detection on the basis of the reference signal and the voltage signal outputted from the I-V converting part 142. Note that a DC voltage may be applied to the terahertz wave generating element 110 as the bias voltage when the terahertz wave inspection apparatus 100 does not use a lock-in detection.

Figure 2A:
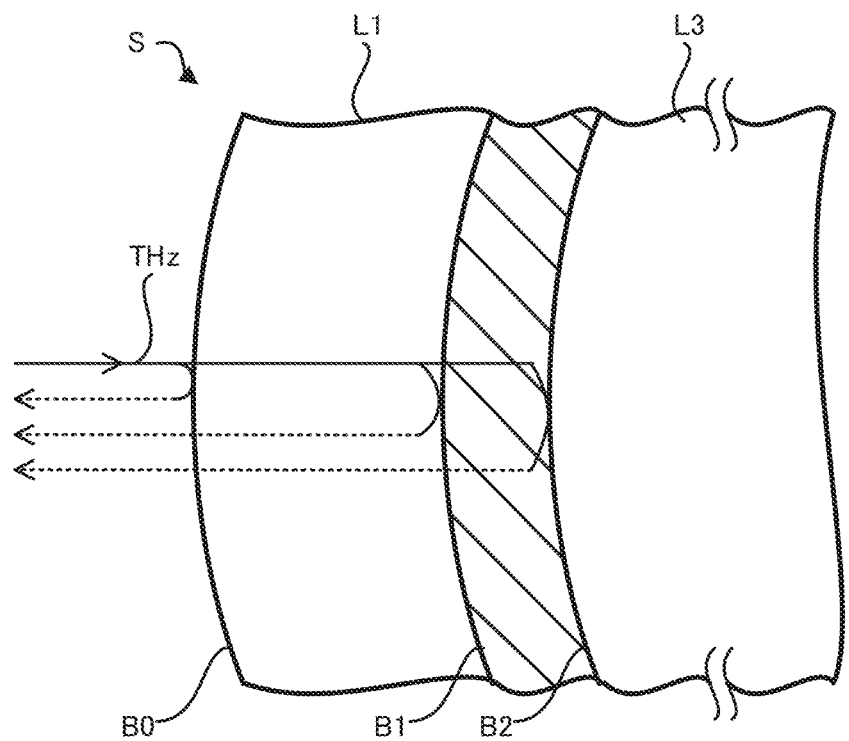
FIG. 2A is a cross-sectional diagram of a sample that illustrates an optical path of a terahertz wave irradiated to the sample and an optical path of the terahertz wave reflected by the sample.

Here, with reference to FIG. 2A to FIG. 2B, the detected waveform DW will be described. As illustrated in FIG. 2A, the terahertz wave THz is irradiated to the outer surface B0 of the sample S. One portion of the terahertz wave THz irradiated to the outer surface B0 is reflected by the outer surface B0. The terahertz wave THz reflected by the outer surface B0 propagates from the sample S to the terahertz wave detecting element 130. One portion of the terahertz wave THz irradiated to the outer surface B0 passes through the outer surface B0 without being reflected by the outer surface B0. The terahertz wave THz passing through the outer surface B0 passes through the inside of the sample S. Then, one portion of the terahertz wave THz passing through the outer surface B0 is reflected by the boundary surface B1 and another one portion of the terahertz wave THz passing through the outer surface B0 passes through the boundary surface B1. One portion of the terahertz wave THz passing through the boundary surface B1 is reflected by the boundary surface B2 and another one portion of the terahertz wave THz passing through the boundary surface B1 passes through the boundary surface B2. Thus, each of the terahertz wave THz reflected by the boundary surface B1 and the terahertz wave THz reflected by the boundary surface B2 also propagates from the sample S to the terahertz wave detecting element 130.

Figure 2B:
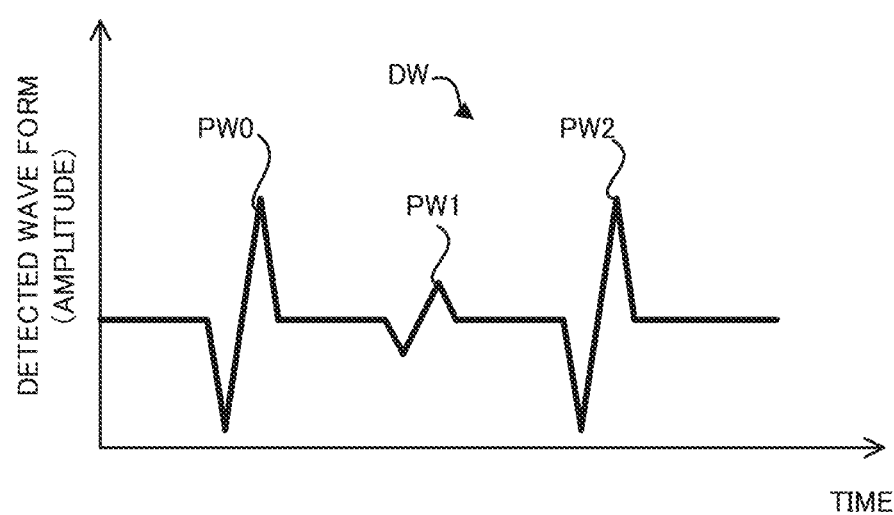
FIG. 2B is a waveform diagram that illustrates a detected waveform.

As a result, as illustrated in FIG. 2B, a pulse wave PW0 corresponding to the terahertz wave THz reflected by the outer surface B0, a pulse wave PW1 corresponding to the terahertz wave THz reflected by the boundary surface B1 and a pulse wave PW2 corresponding to the terahertz wave THz reflected by the boundary surface B2 appear in the detected waveform DW Again in FIG. 1, the signal processing part 152 is configured to estimate the characteristics of the sample S on the basis of the detected waveform DW outputted from the lock-in detecting part 151. For example, the signal processing part 152 is configured to obtain a frequency spectrum of the terahertz wave THz by using a terahertz time domain spectroscopy and to estimate the characteristics of the sample S on the basis of the frequency spectrum.

Especially in the present example, the signal processing part 152 is configured to execute, as one example of the control operation, an estimation operation for estimating the position of the boundary surface B on the basis of the detected waveform DW. In order to execute the estimation operation, the signal processing part 152 has, as logical processing blocks generated in the CPU 150a, a library generating part 1521, a library selecting part 1522 that is one specific example of the "selecting device" and a position estimating part that is one specific example of the "estimating device". Note that the specific example of the operation of each of the library generating part 1521, the library selecting part 1522 and the position estimating part 1523 will be described later in detail and thus its description is omitted here.

(2) Estimation Operation for Estimating Position of Boundary Surface B Executed by Terahertz Wave Inspection Apparatus 100

Figure 3:
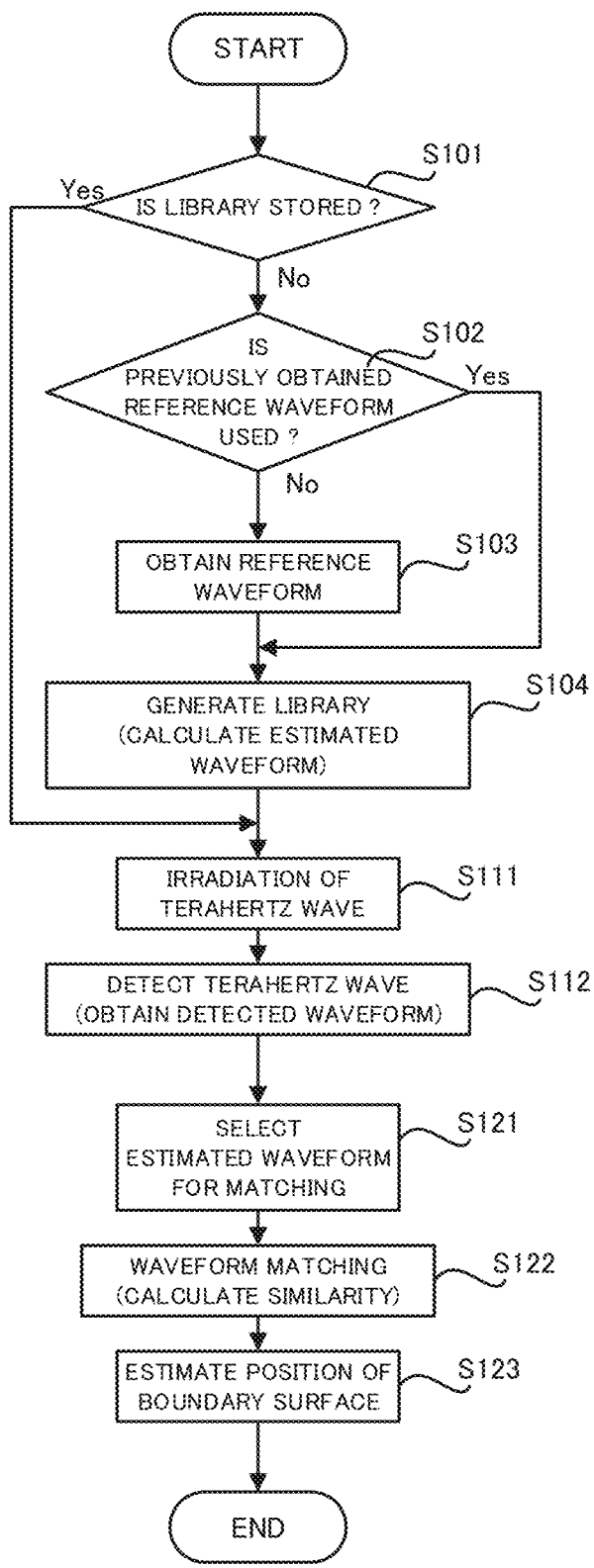
FIG. 3 is a flowchart that illustrates one example of a flow of an estimation operation for estimating a position of a boundary surface executed by the terahertz wave inspection apparatus in the present example.

Next, with reference to FIG. 3, the estimating operation for estimating the position of the boundary surface B executed by the terahertz wave inspection apparatus 100 will be described. FIG. 3 is a flowchart that illustrates one example of a flow of the estimating operation for estimating the position of the boundary surface B executed by the terahertz wave inspection apparatus 100.

As illustrated in FIG. 3, firstly, the library generating part 1521 determines whether or not a library 1521a that is used to estimate the position of the boundary surface B1 is stored in the memory 150b of the controlling part 150 (alternatively, any recording medium) (a step S101). Specifically, the library generating part 1521 determines whether or not the library 1521a previously generated by the library generating part 1521 is stored in the memory 150b.

Here, with reference to FIG. 4, the library 1521a will be described. The library 1521a stores the waveform of the terahertz wave THz that is estimated to be detected by the terahertz wave detecting element 130 when the terahertz wave THz is irradiated to the sample S (namely, a result of the estimation of the detected waveform DW). Hereinafter, the waveform of the terahertz wave THz included in the library 1521a is referred to as an "estimated waveform EW". Especially, the library 1521a stores the estimated waveform EW with the estimated waveform EW being associated with expected candidate position of the boundary surface B1 in the sample S. Namely, the library 1521a stores, for each of the plurality of candidate positions, a plurality of waveforms (namely, the estimated waveforms EW) of the terahertz waves THz each of which is estimated to be detected by the terahertz wave detecting element 130 when the terahertz wave THz is irradiated to the sample S in which the boundary surface B is at a certain candidate position.

Note that the position of the boundary surface B1 varies depending on a thickness of the pipe wall layer L1 and a thickness of the pipe wall layer L2. Thus, in the present example, the library 1521a stores the estimated waveform EW with the estimated waveform EW being associated with an expected candidate of the thickness of each of the pipe wall layers L1 and L2 in the sample S. Namely, the library 1521a stores, for each of the plurality of candidate thicknesses, a plurality of waveforms (namely, the estimated waveforms EW) of the terahertz waves THz each of which is estimated to be detected by the terahertz wave detecting element 130 when the terahertz wave THz is irradiated to the sample S in which each of the pipe wall layers L1 and L2 has a certain thickness.

Moreover, as described above, the pipeline layer L3 is the liquid layer when the chemical flows in the pipeline wall L3 and the pipeline wall L3 is the gaseous layer when the chemical does not flow in the pipeline wall L3. Namely, the boundary surface B2 sometimes forms the boundary between the pipe wall layer L2 (alternatively, the pipe wall layer L1) that is the solid layer and the pipeline layer L3 that is the liquid layer or the boundary surface B2 sometimes forms the boundary between the pipe wall layer L2 (alternatively, the pipe wall layer L1) that is the solid layer and the pipeline layer L3 that is the gaseous layer. When the pipeline layer L3 is the liquid layer, a group refractive index of the pipe wall layer L2 (alternatively, the pipe wall layer L1) with respect to the terahertz wave THz is smaller than a group refractive index of the pipeline layer L3 with respect to the terahertz wave THz. On the other hand, when the pipeline layer L3 is the gaseous layer, the group refractive index of the pipe wall layer L2 (alternatively, the pipe wall layer L1) with respect to the terahertz wave THz is larger than the group refractive index of the pipeline layer L3 with respect to the terahertz wave THz. Thus, a shape of the pulse wave PW2 when the pipeline layer L3 is the liquid layer is inverted from a shape of the pulse wave PW2 when the pipeline layer L3 is the gaseous layer. Therefore, the library 1521a also stores the estimated waveform EW corresponding to the sample S in which the pipeline layer L3 is the liquid layer and the estimated waveform EW corresponding to the sample S in which the pipeline layer L3 is the gaseous layer.

Figure 4:
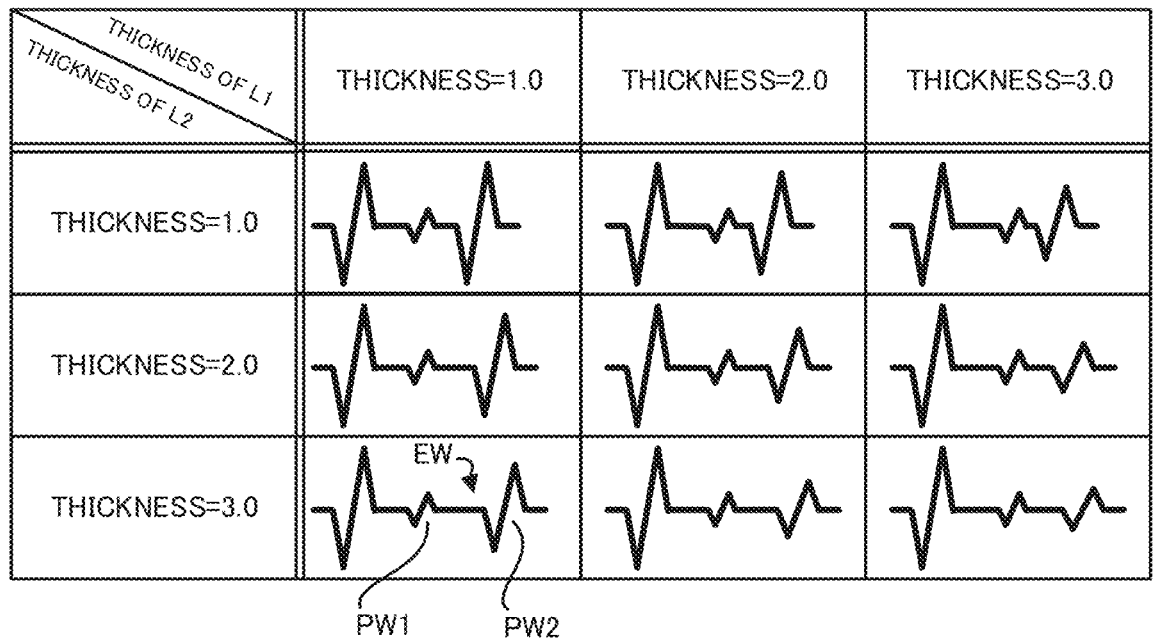
FIG. 4 is a table that illustrates a library indicating a correspondence relationship between a candidate position of the boundary surface and an estimated waveform.
Figure 4:
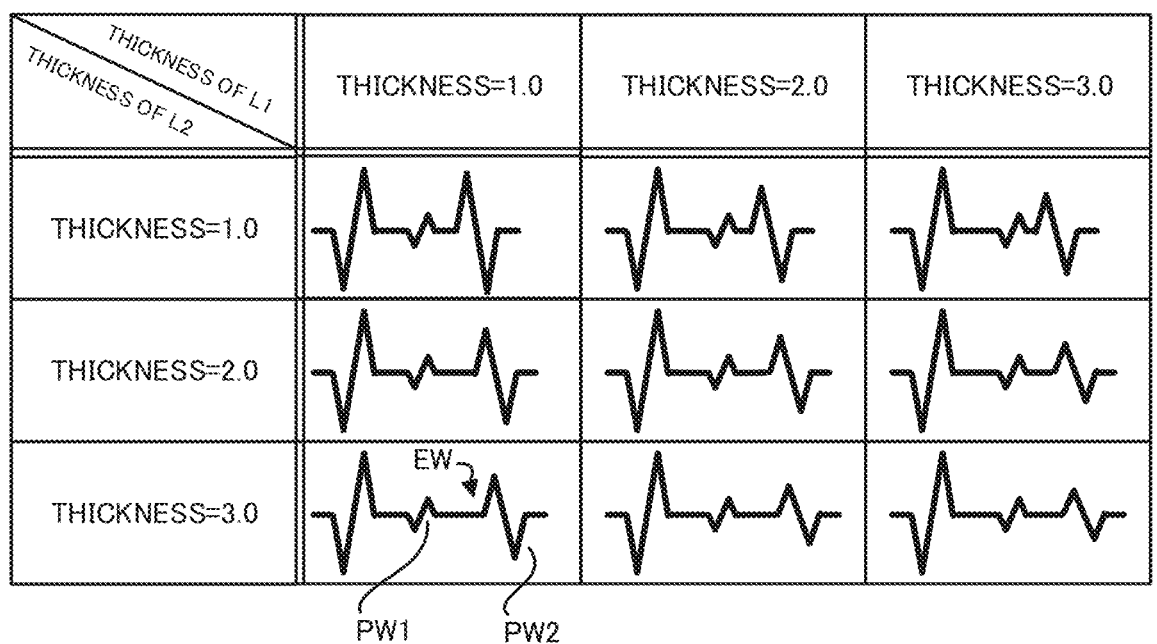

For example, in an example illustrated in FIG. 4, the library 1521a stores, as the estimated waveform EW corresponding to the sample S in which the pipeline layer L3 is the liquid layer, (i) the estimated waveform EW corresponding to the sample S in which the thicknesses of the pipe wall layers L1 and L2 are 1.0 and 1.0, respectively, (ii) the estimated waveform EW corresponding to the sample S in which the thicknesses of the pipe wall layers L1 and L2 are 1.0 and 2.0, respectively, (iii) the estimated waveform EW corresponding to the sample S in which the thicknesses of the pipe wall layers L1 and L2 are 1.0 and 3.0, respectively, (iv) the estimated waveform EW corresponding to the sample S in which the thicknesses of the pipe wall layers L1 and L2 are 2.0 and 1.0, respectively, (v) the estimated waveform EW corresponding to the sample S in which the thicknesses of the pipe wall layers L1 and L2 are 2.0 and 2.0, respectively, (vi) the estimated waveform EW corresponding to the sample S in which the thicknesses of the pipe wall layers L1 and L2 are 2.0 and 3.0, respectively, (vii) the estimated waveform EW corresponding to the sample S in which the thicknesses of the pipe wall layers L1 and L2 are 3.0 and 1.0, respectively, (viii) the estimated waveform EW corresponding to the sample S in which the thicknesses of the pipe wall layers L1 and L2 are 3.0 and 2.0, respectively and (ix) the estimated waveform EW corresponding to the sample S in which the thicknesses of the pipe wall layers L1 and L2 are 3.0 and 3.0, respectively, as illustrated in an upper part of FIG. 4. Moreover, the library 1521a stores, as the estimated waveform EW corresponding to the sample S in which the pipeline layer L3 is the gaseous layer, (i) the estimated waveform EW corresponding to the sample S in which the thicknesses of the pipe wall layers L1 and L2 are 1.0 and 1.0, respectively, (ii) the estimated waveform EW corresponding to the sample S in which the thicknesses of the pipe wall layers L1 and L2 are 1.0 and 2.0, respectively, (iii) the estimated waveform EW corresponding to the sample S in which the thicknesses of the pipe wall layers L1 and L2 are 1.0 and 3.0, respectively, (iv) the estimated waveform EW corresponding to the sample S in which the thicknesses of the pipe wall layers L1 and L2 are 2.0 and 1.0, respectively, (v) the estimated waveform EW corresponding to the sample S in which the thicknesses of the pipe wall layers L1 and L2 are 2.0 and 2.0, respectively, (vi) the estimated waveform EW corresponding to the sample S in which the thicknesses of the pipe wall layers L1 and L2 are 2.0 and 3.0, respectively, (vii) the estimated waveform EW corresponding to the sample S in which the thicknesses of the pipe wall layers L1 and L2 are 3.0 and 1.0, respectively, (viii) the estimated waveform EW corresponding to the sample S in which the thicknesses of the pipe wall layers L1 and L2 are 3.0 and 2.0, respectively and (ix) the estimated waveform EW corresponding to the sample S in which the thicknesses of the pipe wall layers L1 and L2 are 3.0 and 3.0, respectively, as illustrated in a lower part of FIG. 4.

As can be seen by FIG. 4, when the candidate position of the boundary surface B1 is changed, the position of the pulse wave PW1 corresponding to the boundary surface B1 is also changed in the estimated wave form. Moreover, FIG. 4 illustrates that the shape of the pulse wave PW2 when the pipeline layer L3 is the liquid layer (see the upper part of FIG. 4) is inverted from the shape of the pulse wave PW2 when the pipeline layer L3 is the gaseous layer (see the upper part of FIG. 4).

Again in FIG. 3, as a result of the determination at the step S101, when it is determined that the library 1521a is stored in the memory 150b (the step S101: Yes), the library generating part 1521 does not newly generate the library 1521a. Thus, the controlling part 150 estimates the positons of the boundary surface B1 by using the existing library 1521a stored in the memory 150b.

On the other hand, as a result of the determination at the step S101, when it is determined that the library 1521a is not stored in the memory 150b (the step S101: No), the library generating part 1521 newly generates the library 1521a (a step S102 to a step S104). Specifically, the library generating part 1521 determines whether or not the library 1521a is generated by using a reference waveform BW that is already obtained previously (the step S102). Note that the reference waveform BW is the waveform of the terahertz wave THz detected by the terahertz wave detecting element 130 when the terahertz wave THz is irradiated to the sample S (alternatively, any object that is different from the sample S) and is the waveform of the terahertz wave THz that is used as a standard to generate the library 1521a.

As a result of the determination at the step S102, when it is determined that the library 1521a is not generated by using the reference waveform BW that is already obtained previously (the step S102: No), the library generating part 1521 newly obtains the reference waveform BW (the step S102). Specifically, the terahertz wave THz is irradiated to the sample S (alternatively, any object that is different from the sample S) under the control of the library generating part 1521. As a result, the detected waveform DW is obtained. At least one portion of the detected waveform DW (for example, the pulse wave PW0 corresponding to the outer surface B0) is used as the reference waveform BW.

On the other hand, as a result of the determination at the step S102, when it is determined that the library 1521a is generated by using the reference waveform BW that is already obtained previously (the step S102: Yes), the library generating part 1521 does not newly obtain the reference waveform BW.

Then, the library generating part 1521 generates the library 1521a by using the reference waveform BW (the step S104). Specifically, firstly, the library generating part 1521 sets, on a simulation model that simulates the sample S, physicality (for example, a permittivity, a magnetic permeability, an attenuation rate, an electrical conductivity and the like) of each of the pipe wall layer L1 to the pipeline layer L3 to an actually measured value that is obtained by actually measuring the physicality of each of the layer L1 to the layer L3 in advance. Then, the library generating part 1521 calculates (in other words, replicates) the estimated waveform EW while changing the position of the boundary surface B1 (namely, the thickness of each of the pipe wall layers L1 and L2) on the simulation model. Note that the library generating part 1521 may use an existing method for simulating the waveform of the electromagnetic wave as a method of calculating the estimated waveform EW. A FDTD (Finite Difference Time Domain) method or an ADE-FDTD (Auxiliary Differential Equation FDTD) method is one example of the existing method.

Then, the terahertz wave generating element 110 emits the terahertz wave THz to the outer surface B0 of the sample S (a step S111). As a result, the terahertz wave detecting element 130 detects the terahertz wave THz reflected by the sample S (a step S112). Namely, the signal processing part 152 obtains the detected waveform DW (the step S112).

Then, the position estimating part 1523 estimates the position of the boundary surface B1 by executing a matching between the detected waveform DW and the estimated waveforms EW stored in the library 1521a (namely, comparing both waveforms) (a step S121 to a step S123). Especially in the present example, the position estimating part 1523 estimates the position of the boundary surface B1 by executing the matching between the detected waveform DW and one portion of the estimated waveforms EW stored in the library 1521a instead of executing the matching between the detected waveform DW and all of the estimated waveforms EW stored in the library 1521a (namely, comparing both waveforms) (a step S121 to a step S123). Note that the estimated waveform EW that is to be compared with the detected waveform DW is referred to as a "partial estimated waveform EW'" in the below described description.

Specifically, as described above, the library 1521a stores the estimated waveform EW corresponding to the sample S in which the pipeline layer L3 is the liquid layer and the estimated waveform EW corresponding to the sample S in which the pipeline layer L3 is the gaseous layer. On the other hand, the shape of the pulse wave PW2 included in the detected waveform DW substantially indicates which the pipeline layer L3 is the liquid layer or the gaseous layer. Therefore, when the shape of the pulse wave PW2 included in the detected waveform DW indicates that the pipeline layer L3 is the liquid layer, the position estimating part 1523 is capable of estimating the position of the boundary surface B1 by executing the matching between the detected waveform DW and the estimated waveforms EW corresponding to the sample S in which the pipeline layer L3 is the liquid layer without executing the matching between the detected waveform DW and the estimated waveforms EW corresponding to the sample S in which the pipeline layer L3 is the gaseous layer. Therefore, in this case, the estimated waveforms EW corresponding to the sample S in which the pipeline layer L3 is the liquid layer is the partial estimated waveform EW'. Similarly, when the shape of the pulse wave PW2 included in the detected waveform DW indicates that the pipeline layer L3 is the gaseous layer, the position estimating part 1523 is capable of estimating the position of the boundary surface B1 by executing the matching between the detected waveform DW and the estimated waveforms EW corresponding to the sample S in which the pipeline layer L3 is the gaseous layer without executing the matching between the detected waveform DW and the estimated waveforms EW corresponding to the sample S in which the pipeline layer L3 is the liquid layer. Therefore, in this case, the estimated waveforms EW corresponding to the sample S in which the pipeline layer L3 is the gaseous layer is the partial estimated waveform EW'.

In order to estimate the position of the boundary surface B1 by executing the matching between the detected waveform DW and the partial estimated waveform EW', firstly, the library selecting part 1522 selects the partial estimated waveform(s) EW' that is to be compared with the detected waveform DW from all of the estimated waveforms EW stored in the library 1521a (a step S121). Specifically, the library selecting part 1522 selects the partial estimated waveform EW' on the basis of the shape of the pulse wave PW2.

Here, with reference to FIG. 5A to FIG. 5B, a difference between the shape of the pulse wave PW2 from the sample S in which the pipeline layer L3 is the liquid layer and the shape of the pulse wave PW2 from the sample S in which the pipeline layer L3 is the gaseous layer will be described.

Figure 5A:
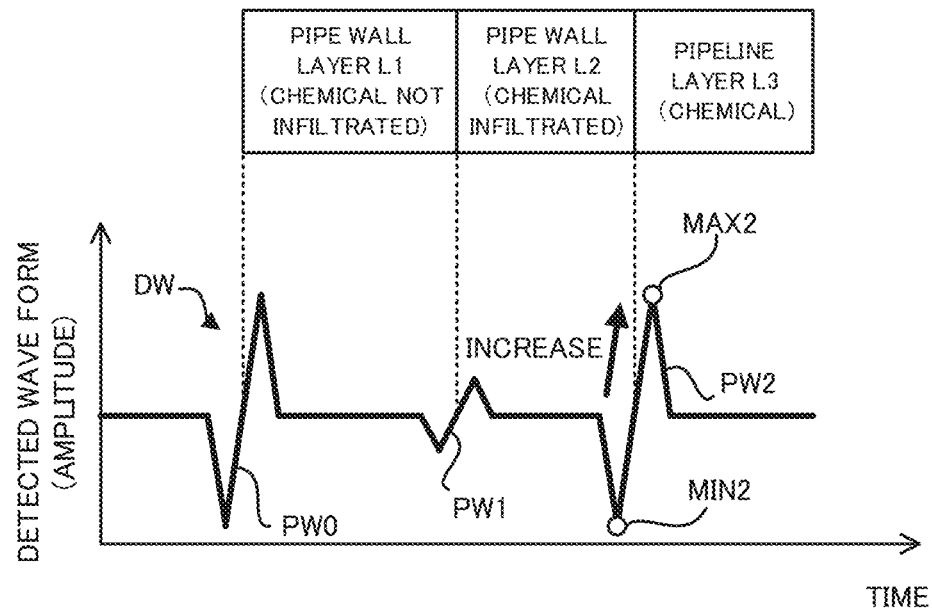
FIG. 5A is a waveform diagram that illustrates a shape of a pulse wave from the sample in which a pipeline layer is a liquid layer and FIG. 5B is a waveform diagram that illustrates a shape of a pulse wave from the sample in which the pipeline layer is a gaseous layer.

FIG. 5A is a waveform diagram that illustrates the shape of the detected waveform DW corresponding to the sample S in which the pipeline layer L3 is the liquid layer. In the sample in which the pipeline layer L3 is the liquid layer, the group refractive index of the pipe wall layer L2 is smaller than the group refractive index of the pipeline layer L3, and thus, the pulse wave PW2 has a shape in which a local minimum value MIN2 appears before a local maximum value MAX2. In other words, the pulse wave PW2 has a shape in which a signal level increases (namely, a slope of the waveform of the pulse wave PW2 is positive) between the local minimum value MIN2 and the local maximum value MAX2.

Figure 5B:
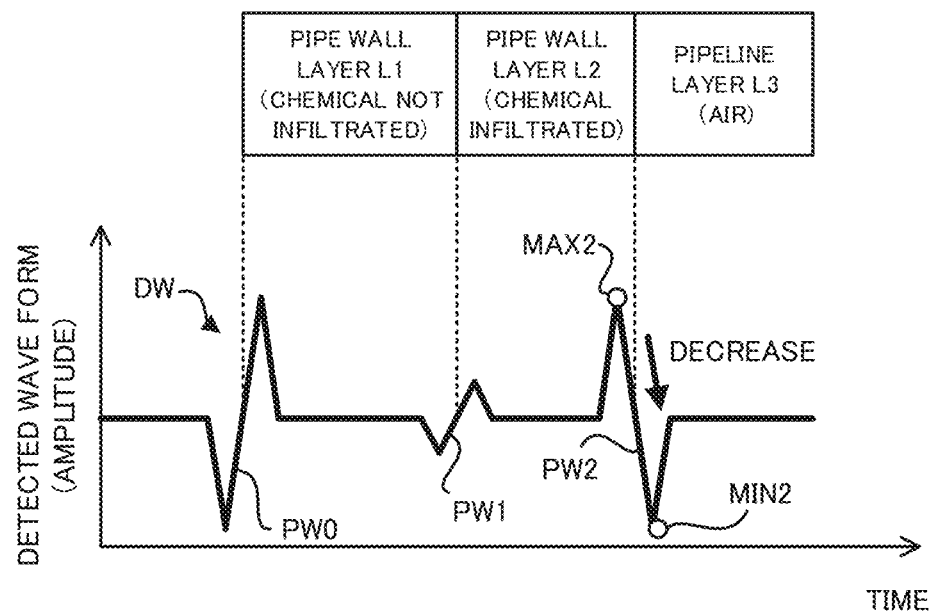

On the other hand, FIG. 5B is a waveform diagram that illustrates the shape of the detected waveform DW corresponding to the sample S in which the pipeline layer L3 is the gaseous layer. In the sample in which the pipeline layer L3 is the gaseous layer, the group refractive index of the pipe wall layer L2 is larger than the group refractive index of the pipeline layer L3, and thus, the pulse wave PW2 has a shape in which the local minimum value MIN2 appears after the local maximum value MAX2. In other words, the pulse wave PW2 has a shape in which a signal level decreases (namely, the slope of the waveform of the pulse wave PW2 is negative) between the local minimum value MIN2 and the local maximum value MAX2.

Namely, the pulse wave PW2 from the sample S in which the pipeline layer L3 is the liquid layer and the pulse wave PW2 from the sample S in which the pipeline layer L3 is the gaseous layer are distinguished from each other on the basis of the difference of a relative relationship between an appeared positions of the local minimum value and the local maximum value of the pulse wave PW. Alternatively, the pulse wave PW2 from the sample S in which the pipeline layer L3 is the liquid layer and the pulse wave PW2 from the sample S in which the pipeline layer L3 is the gaseous layer are distinguished from each other on the basis of the difference of the slope of the waveform of the pulse wave PW2 between the local minimum value and the local maximum value. The library selecting part 1522 selects the partial estimated waveform EW' from the library 1521*a* by focusing the shape of the pulse wave PW2.

Again in FIG. 3, then, the position estimating part 1523 executes the matching between the detected waveform DW and the partial estimated waveforms EW' selected at the step S121 (a step S122). Specifically, the position estimating part 1523 calculates a similarity degree (a degree of a similarity) R between the detected waveform DW and the partial estimated waveform EW'. Note that the similarity degree R is an index that represents how similar the detected waveform DW and the partial estimated waveform EW' are with each other. Thus, the similarity degree R is an index that becomes larger as the detected waveform DW and the partial estimated waveform EW' are more similar with each other. Namely, the similarity degree R is substantially same as a correlated function between the detected waveform DW and the partial estimated waveform EW'.

The position estimating part 1523 may calculate the similarity degree R by using an existing method of calculating the similarity degree between two signal waveforms. The following equations 1 and 2 are one examples of the existing method. Note that a "$u_d(t)$" represents the amplitude of the detected waveform DW at a time t (note that the time t is a time included in the above described waveform range WR), a "$u_e(t)$" represents the amplitude of the partial estimated waveform EW' at the time t, a "$\mu_d$" represents an average value (what we call a DC component) of the amplitude of the detected waveform DW and a "$\mu_e$" represents an average value (what we call a DC component) of the amplitude of the partial estimated waveform EW' in the equation 1 and the equation 2.

$$R = \frac{\sum (u_d(t) - \mu_d)(u_e(t) - \mu_e)}{\sqrt{\sum (u_d(t) - \mu_d)^2} \sqrt{\sum (u_e(t) - \mu_e)^2}} \quad \text{[Equation 1]}$$

$$R = \sum (u_d(t) - \mu_d)^2 \quad \text{[Equation 2]}$$

The position estimating part 1523 executes the operation for calculating the similarity degree R with respect to each of the plurality of partial estimated waveforms EW' selected at the step S121. As a result, a plurality of similarity degrees R that correspond to the plurality of partial estimated waveforms EW' are calculated.

Then, the position estimating part 1523 estimates the position of the boundary surface B1 on the basis of the plurality of similarity degrees R calculated at the step S122 (a step S123). Specifically, the position estimating part 1523 determines the partial estimated waveform EW' corresponding to the maximum similarity degree R of the plurality of similarity degrees R. The position estimating part 1523 estimates that the positon of the boundary surface B1 corresponding to the determined partial estimated waveform EW' are the position of the boundary surface B1.

(4) Technical Effect of Terahertz Wave Inspection Apparatus 100

As described above, the terahertz wave inspection apparatus 100 in the present example is capable of properly estimating the position of the boundary surface B1 (namely, the position of the boundary surface B in the sample S). Especially, the terahertz wave inspection apparatus 100 is capable of estimating the position of the boundary surface B1 without executing the matching between the detected waveform DW and all of the estimated waveforms EW stored in the library 1521*a*. Thus, a processing cost for estimating the position of the boundary surface B1 can be reduced, compared to a terahertz wave inspection apparatus in a comparison example that is configured to execute the matching between the detected waveform DW and all of the estimated waveforms EW stored in the library 1521*a*. Moreover, the terahertz wave inspection apparatus 100 is capable of selecting the partial estimated waveform EW' on the basis of the detected waveform DW (especially, on the basis of the pulse wave PW2) without requiring an instruction from a user for selecting the partial estimated waveform EW' that is to be compared with the detected waveform DW. Thus, there is an advantage to save the user's time.

Note that the terahertz wave inspection apparatus 100 has the library selecting part 1522 configured to directly select the partial estimated waveform EW' in the above described description. However, the terahertz wave inspection apparatus 100 may not have the library selecting part 1522. Even in this case, it can be said that the one portion of the estimated waveforms EW stored in the library 1521*a* is substantially used as the partial estimated waveform EW', as long as the position estimating part 1523 executes the matching between the detected waveform DW and one portion of the estimated waveforms EW stored in the library 1521*a* (namely, the position estimating part 1523 does not execute the matching between the detected waveform DW and another one portion of the estimated waveforms EW stored in the library 1521*a*). Namely, in the present example, "selecting the partial estimated waveform EW'" includes not only an operation of directly selecting the partial estimated waveform EW' but also any operation for narrowing (in other words, determining) the estimated waveform(s) EW that is to be compared with the detected waveform DW by the position estimating part 1523.

Moreover, the example in which the sample S is the pipe in which the chemical flows is described in the above described description. However, the sample S may be a sample in which two or more layers L are laminated. In this case, two or more layers L may be made from materials having different physicality, respectively. At least one of two or more layers L may be made from a solid material. At least one of two or more layers L may be made of a liquid material. At least one of two or more layers L may be made of a gaseous material. Even in this case, the terahertz wave inspection apparatus 100 may estimate the boundary surface B by selecting the partial estimated waveform EW' on the basis of the detected waveform DW. Specifically, the terahertz wave inspection apparatus 100 may select the partial estimated waveform EW' on the basis of the condition (for example, the above described shape) of a specific pulse wave PW included in the detected waveform DW. As one example of the specific pulse wave PW, there is a pulse wave PW that corresponds to the boundary surface B between one layer L and another layer L in which a condition of a phase is changeable (for example, the condition of the phase is changeable from the liquid condition to the sold or gaseous condition, from the gaseous condition to the sold or liquid condition or from the solid condition to the liquid or gaseous condition). As another one example of the specific pulse wave PW, there is a pulse wave PW that corresponds to the boundary surface B between two adjacent layers L between which a magnitude relationship of the group refractive index may invert (namely, adjacent first and second layers L between which the magnitude relationship of the group refractive index is switchable between a condition where the group refractive index of the first layer L is larger than the group refractive index of the second layer L and a condition where the group refractive index of the first layer L is smaller than the group refractive index of the second layer L).

Moreover, although the terahertz wave inspection apparatus 100 detects the terahertz wave THz reflected by the sample S, the terahertz wave inspection apparatus 100 may detect the terahertz wave THz passing through the sample S.

The present invention is not limited to the above described embodiment. The present invention may be changed without departing from the essence or spirit of the invention which can be read from the claims and the entire specification. Each of an inspection apparatus, an inspection method, a computer program and a recording medium each of which involves such changes is also intended to be within the technical scope of the present invention.

REFERENCE SIGNS LIST

100 terahertz wave inspection apparatus
101 pulse laser apparatus
110 terahertz wave generating element
120 optical delay mechanism
130 terahertz wave detecting element
141 bias voltage generating part
142 I-V converting part
150 controlling part
150*a* CPU
150*b* memory
151 lock-in detecting part
152 signal processing part
1521 library generating part
1521*a* library
1522 library selecting part
1523 position estimating part
161 beam splitter
162, 163 reflective mirror
164 half mirror
LB1 pump light
LB2 probe light
THz terahertz wave
S sample
L, L1, L2, L3 layer
B, B0, B1, B2 boundary surface
DW detected waveform
EW estimated waveform
BW reference waveform
PW0, PW1, PW2 pulse wave

The invention claimed is:

1. An inspection apparatus, comprising:
an irradiating device that is configured to irradiate a sample in which a plurality of layers are laminated with a terahertz wave;
a detecting device that is configured to detect the terahertz wave from the sample to obtain a detected waveform;
a selecting device that is configured to select, as a matching candidate, one portion of a library on the basis of a condition of a boundary surface pulse wave of the detected waveform, the boundary surface pulse wave corresponding to a boundary surface of the plurality of layers, the library indicating an estimated waveform of the terahertz wave from the sample; and
an estimating device that is configured to determine the estimated waveform that is similar to the detected waveform from the matching candidate, and estimate that a position corresponding to the determined estimated waveform is a position of the boundary surface.

2. The inspection apparatus according to claim 1, wherein the selecting device selects one portion of the library as the matching candidate on the basis of the condition of the boundary surface pulse wave that includes at least one of a relative relationship between positions at which a local maximum value and a local minimum value of the boundary surface pulse wave appear and a slope of a waveform of the boundary surface pulse wave between the local maximum value and the local minimum value.

3. The inspection apparatus according to claim 2, wherein the selecting device is configured to select a first portion of the library as the matching candidate when the condition of the boundary surface pulse wave is a first condition, and select a second portion of the library as the matching candidate that is different from the first portion when the condition of the boundary surface pulse wave is a second condition that is different from the first condition.

4. The inspection apparatus according to claim 2, wherein the boundary surface pulse wave corresponds to the boundary surface forming a border between adjacent two layers, and a magnitude relationship of refractive index of the adjacent two layers with respect to the terahertz wave inverts depending on the condition of the adjacent two layers.

5. The inspection apparatus according to claim 4, wherein the boundary surface pulse wave corresponds to the boundary surface forming a border between a first layer and a second layer, and a condition of a phase in the second layer changes.

6. The inspection apparatus according to claim 5, wherein the selecting device is configured to select a first portion of the library as the matching candidate when the condition of the boundary surface pulse wave is a first condition, and select a second portion of the library as the matching candidate that is different from the first portion when the condition of the boundary surface pulse wave is a second condition that is different from the first condition.

7. The inspection apparatus according to claim 4, wherein the selecting device is configured to select a first portion of the library as the matching candidate when the condition of the boundary surface pulse wave is a first condition, and select a second portion of the library as the matching candidate that is different from the first portion when the condition of the boundary surface pulse wave is a second condition that is different from the first condition.

8. The inspection apparatus according to claim 2, wherein the boundary surface pulse wave corresponds to the boundary surface forming a border between a first layer and a second layer, and a condition of a phase in the second layer changes.

9. The inspection apparatus according to claim 8, wherein the selecting device is configured to select a first portion of the library as the matching candidate when the condition of the boundary surface pulse wave is a first condition, and select a second portion of the library as the matching candidate that is different from the first portion when the condition of the boundary surface pulse wave is a second condition that is different from the first condition.

10. The inspection apparatus according to claim 1, wherein
the boundary surface pulse wave corresponds to the boundary surface forming a border between adjacent two layers, and a magnitude relationship of refractive index of the adjacent two layers with respect to the terahertz wave inverts depending on the condition of the adjacent two layers.

11. The inspection apparatus according to claim 10, wherein
the boundary surface pulse wave corresponds to the boundary surface forming a border between a first layer and a second layer, and a condition of a phase in the second layer changes.

12. The inspection apparatus according to claim 11, wherein
the selecting device is configured to select a first portion of the library as the matching candidate when the condition of the boundary surface pulse wave is a first condition, and select a second portion of the library as the matching candidate that is different from the first portion when the condition of the boundary surface pulse wave is a second condition that is different from the first condition.

13. The inspection apparatus according to claim 10, wherein
the selecting device is configured to select a first portion of the library as the matching candidate when the condition of the boundary surface pulse wave is a first condition, and select a second portion of the library as the matching candidate that is different from the first portion when the condition of the boundary surface pulse wave is a second condition that is different from the first condition.

14. The inspection apparatus according to claim 1, wherein
the boundary surface pulse wave corresponds to the boundary surface forming a border between a first layer and a second layer, and a condition of a phase in the second layer changes.

15. The inspection apparatus according to claim 14, wherein
the selecting device is configured to select a first portion of the library as the matching candidate when the condition of the boundary surface pulse wave is a first condition, and select a second portion of the library as the matching candidate that is different from the first portion when the condition of the boundary surface pulse wave is a second condition that is different from the first condition.

16. The inspection apparatus according to claim 1, wherein
the selecting device is configured to select a first portion of the library as the matching candidate when the condition of the boundary surface pulse wave is a first condition, and select a second portion of the library as the matching candidate that is different from the first portion when the condition of the boundary surface pulse wave is a second condition that is different from the first condition.

17. An inspection method, comprising:
an irradiating step in which a terahertz wave is irradiated to a sample in which a plurality of layers are laminated;
a detecting step in which the terahertz wave from the sample is detected to obtain a detected waveform;
a selecting step in which one portion of a library is selected, as a matching candidate, on the basis of a condition of a boundary surface pulse wave of the detected waveform, the boundary surface pulse wave corresponding to a boundary surface of the plurality of layers, the library indicating an estimated waveform of the terahertz wave from the sample; and
an estimating step in which the estimated waveform that is similar to the detected waveform is determined from the matching candidate, and a position corresponding to the determined estimated waveform is estimated to be a position of the boundary surface.

18. A non-transitory computer-readable recording medium on which is stored a computer program which, when executed by a computer, causes the computer to perform the method of claim 17.

* * * * *